April 19, 1932.  A. R. HOLTMAN  1,854,612
PLATE AND DISH WARMER
Filed Oct. 25, 1930
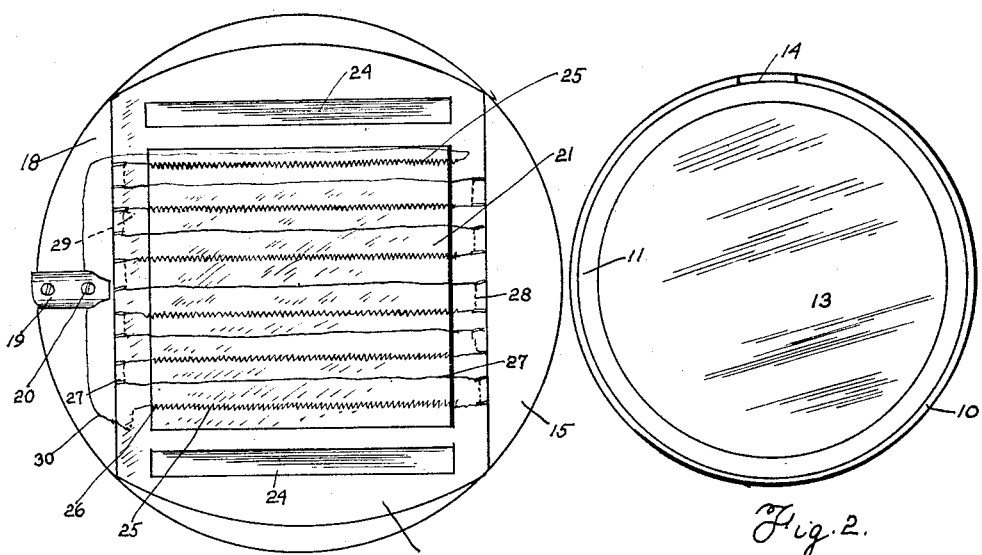
INVENTOR
Axel R. Holtman Patented Apr. 19, 1932

1,854,612

UNITED STATES PATENT OFFICE

AXEL R. HOLTMAN, OF PERRIS, CALIFORNIA

PLATE AND DISH WARMER

Application filed October 25, 1930. Serial No. 491,169.

This invention relates to improvements in household and restaurant devices and appliances and more particularly to plate warmers and the like.

One of the objects of this invention is to provide a simple, efficient and inexpensive device that enables hot dishes served in a dinner course or the like to remain hot for a considerable period after being placed upon a table.

It is well known that in many homes and in fact lunch rooms hot dishes and plates are placed upon the dining table for immediate consumption of the contents thereof on the part of diners, but due to delays, inattention, absence of diners, and other reasons, the contents of the dishes or plates soon become cool and even unpalatable and call for rewarming by a removal back to the kitchen.

Another object of the present invention is to provide a light, durable and inconspicuous plate warmer which is electrically warmed in a short period of time, and which, resting upon a table, near the rim thereof, is out of the way of other dishes placed upon a table, yet presents a warming surface upon which plates and dishes may directly be placed, the electrical warmth generated inside the plate warmer or tray sufficing to prevent the the temperature of the contents of the surmounted dishes from materially lowering, so that altho some time may elapse before the contents of the dish or plate is tasted by a diner the same will be warm and edible.

A further purpose thereof is to provide a tray with an asbestos warming surface and under legs that raise the warmer slightly above the table, and that provide a warming surface upon which the hot plate or dish may be set to await the desires of a diner sitting near.

A still further object of this invention is to provide a warming tray composed of a central concealed chamber in which an electrical warming device is located, having a plug attachment to which wire connections from a plug may readily be connected, this tray providing a top base of insulator material designed to be speedily warmed after the circuit to the electrical warming device is closed.

With the above and other objects in view, my invention consists in the combination, arrangement and details of construction disclosed in the drawings and specification, and then more particularly pointed out in the appended claims.

In the drawings, wherein similar reference characters designate similar parts thruout the respective views, Figure 1 is a top plan view of the tray, with the top warming base removed, Figure 2 is a bottom plan view of the cover warming part, Figure 3 is a cross-sectional view of the cover plate, Figure 4 is an end view of the warmer with cover plate detached, Figure 5 is a top plan view of my invention, Figure 6 is an end view, taken at right angles to the parts shown in Figure 4, Figure 7 is a cross-sectional view taken medially of Figure 5, Figure 8 is a bottom plan view of my invention, and Figure 9 is a side view of my invention.

Reference being had to the drawings, which are merely illustrative of my invention the various details of construction are disclosed. The plate or dish warmer consists of two sections, one being the warmer section, and the other being a cover plate. I will first describe the cover plate. The cover plate consists of a preferably circular disk or base 13 made preferably of insulating material such as asbestos. A circular metal rim is provided to the edge of which the asbestos disk or base 13 is attached. The rim may have a pair of spaced apart right-angularly disposed annular flanges 11 and 12 between which the peripheral or marginal edge of he asbestos base will be frictionally held. The main rim itself is cut away as at 14 to provide a recess thru which will project removably the electrical circuit closer about to be described.

The warmer section consists of a preferably insulator plate such as the wooden plate 10

15 secured as a bottom into the rim 10 by fasteners 15' or the like. A series of legs 16 are secured upon the marginal edge of the underside of the bottom plate 15, and these legs serve to space the tray slightly above and out of contact with the table upon which the legs rest.

A preferably rectangular frame of insulating material is shaped and arranged in surmounted relation upon the wooden bottom plate 15 of the warmer tray. I take asbestos sheets and cut same away to provide a main strip 17 which overlaps the plate 15, and is an imperforate sheet, being secured flat upon the plate 15. A series of asbestos strips 22 are secured in surmounted relation upon the edges of the sheet 17, and other strips are disposed at right angles thereto or in such positions near the edge of the frame as to enable a third rectangular asbestos sheet 23 to be secured upon the strips 22 and the auxiliary strips 22'. This third rectangular asbestos sheet 23 provides a central space or air gap 21 between the asbestos frame and the superpose base or warming surface 13 of the cover plate.

A series of electrical resistance coils 25 are arranged in parallelism and caused to extend across the air gap 21 with intervening interconnected wires 26 also parallel to the coils. The end edges of the asbestos strip 23 are slit as at the points 27 to allow a terminal of each coil or an uncoiled portion thereof to enter said slit extend as a loop under and in contact with the sheet 23, come up thru the next adjacent slit 27, then provide one of the uncoiled wires 26, and on the opposite side of the frame enter another slit, 27, be looped under the sheet 23, come up thru the next adjacent slit and then form another coil 25 bridged across the air gap 21. In the same manner the successive coils are tied, upon the asbestos frame so that a warming area commensurate with the zone of the air gap is provided, and finally the free terminal wires 30 of the coils are connected into a circuit closing device or plug 19 fixedly secured upon the plate 15 by fasteners 20 which plug presents electrical contact points 20a accessible from outside the tray to enable a flexible cord to be attached by its plug to the plug 19 in a well known manner so as to provide current to the warmer. The cover plate is then taken and its rim 10 is slipped down around the bottom plate 15, and attached thereto, and the asbestos base 13 will contact, if need be, the coils so as to be readily warmed thereby. When the tray is placed upon a table, and the flexible cord connected, in a short while current flows in the coils which raises the temperature of the base 13 considerably as the coils soon glow. I do not mean to confine myself to the exact details of construction but claim all variations falling within the purview of the appended claims.

What I desire to claim and secure by Letters Patent is:—

1. A device as described consisting of a flat horizontal asbestos top, a sheet metal shell extending downwardly therefrom marginally thereof and having a rightangular double-walled flange clinched upon the opposite sides of the marginal rim of the top, said shell being cut away to provide a notch, a wooden plate secured in spaced relation into the lower part of the shell so as to close the same, an ablong asbestos frame surmounting the wooden plate and providing an open space longitudinally and transversely of itself and over the major portion of the area of the shell, a continuous length of heating wire formed into a plurality of spaced apart parallel coils interconnected by a series of staggered bends, two opposing edges of the frame being formed with a series of staggered incut slits arranged in pairs, each bend of the heating wire being pressed into a pair of slits on opposite edges of the frame as a means of stringing the coils thereof taut across the gap of the mentioned open space, and a terminal plug fitted into the notch and having attached thereto the opposite ends of the heating wire, said coils engaging the effective area of the asbestos top.

2. A plate warmer consisting of an annular drum having an insulator floor, an asbestos top face, legs supporting the drum in elevated position, an asbestos frame consisting of an imperforate bottom sheet overlying the floor, a series of asbestos strips overlying the marginal edges of the bottom sheet and an uppermost marginal rectangular strip supported on overlying contact upon the asbestos strips and providing a main opening, there being an uninterrupted continuous air jacket intervening between the marginal edges of the frame and the adjacent wall of the shell, a series of spaced parallel resistance coils strung across the said opening and also contacting the under side of the top of the drum, and a plug operatively secured to said drum and projecting outwardly therefrom and carrying a flexible cord designed to connect with said coils.

In witness whereof he has hereunder set his hand this 3rd day of October, 1930.

AXEL R. HOLTMAN.